(12) United States Patent
Takeuchi et al.

(10) Patent No.: US 7,411,695 B2
(45) Date of Patent: Aug. 12, 2008

(54) IMAGE READING APPARATUS AND ORIGINAL COVER THEREOF

(75) Inventors: Yukitoshi Takeuchi, Kanagawa (JP); Atsushi Miyahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 838 days.

(21) Appl. No.: 09/899,022

(22) Filed: Jul. 6, 2001

(65) Prior Publication Data
US 2002/0054359 A1 May 9, 2002

(30) Foreign Application Priority Data
Jul. 12, 2000 (JP) .............................. 2000-211094
Jul. 28, 2000 (JP) .............................. 2000-229257

(51) Int. Cl.
*H04N 1/36* (2006.01)
(52) U.S. Cl. .................... 358/1.9; 358/400; 358/401
(58) Field of Classification Search ................ 358/1.9, 358/400, 497, 401, 407; 399/380, 80
See application file for complete search history.

(56) References Cited

U.S. PATENT DOCUMENTS 4,114,236 A * 9/1978 Vandervort .................. 16/335
4,172,660 A * 10/1979 Yanofsky et al. ............... 355/75
4,386,847 A * 6/1983 Torto et al. ..................... 355/75
5,541,712 A * 7/1996 Fujitaka et al. ............. 399/380
5,812,285 A    9/1998 Lin et al.
6,233,426 B1 * 5/2001 Lee et al. ..................... 399/380

OTHER PUBLICATIONS

Original copy and English translation of People's Republic of China Office Action dated Apr. 30, 2004 (Application No. 01122873.3).

* cited by examiner

*Primary Examiner*—Edward L. Coles
*Assistant Examiner*—James A Thompson
(74) *Attorney, Agent, or Firm*—Fitzpatrick, Cella, Harper & Scinto

(57) ABSTRACT

The original cover of an image reading apparatus for covering an original stand which is provided on the image reading apparatus and on which an original is placed is provided with a cover member for covering the original placed on the original stand, and a hinge member having one end thereof pivotally supported by the cover member and having the other end thereof mounted on and pivotally supported by the original stand. The original cover is characterized in that the cover member is biased in a direction in which it is opened relative to the hinge member and is biased toward a rotary shaft, by biasing means.

6 Claims, 10 Drawing Sheets

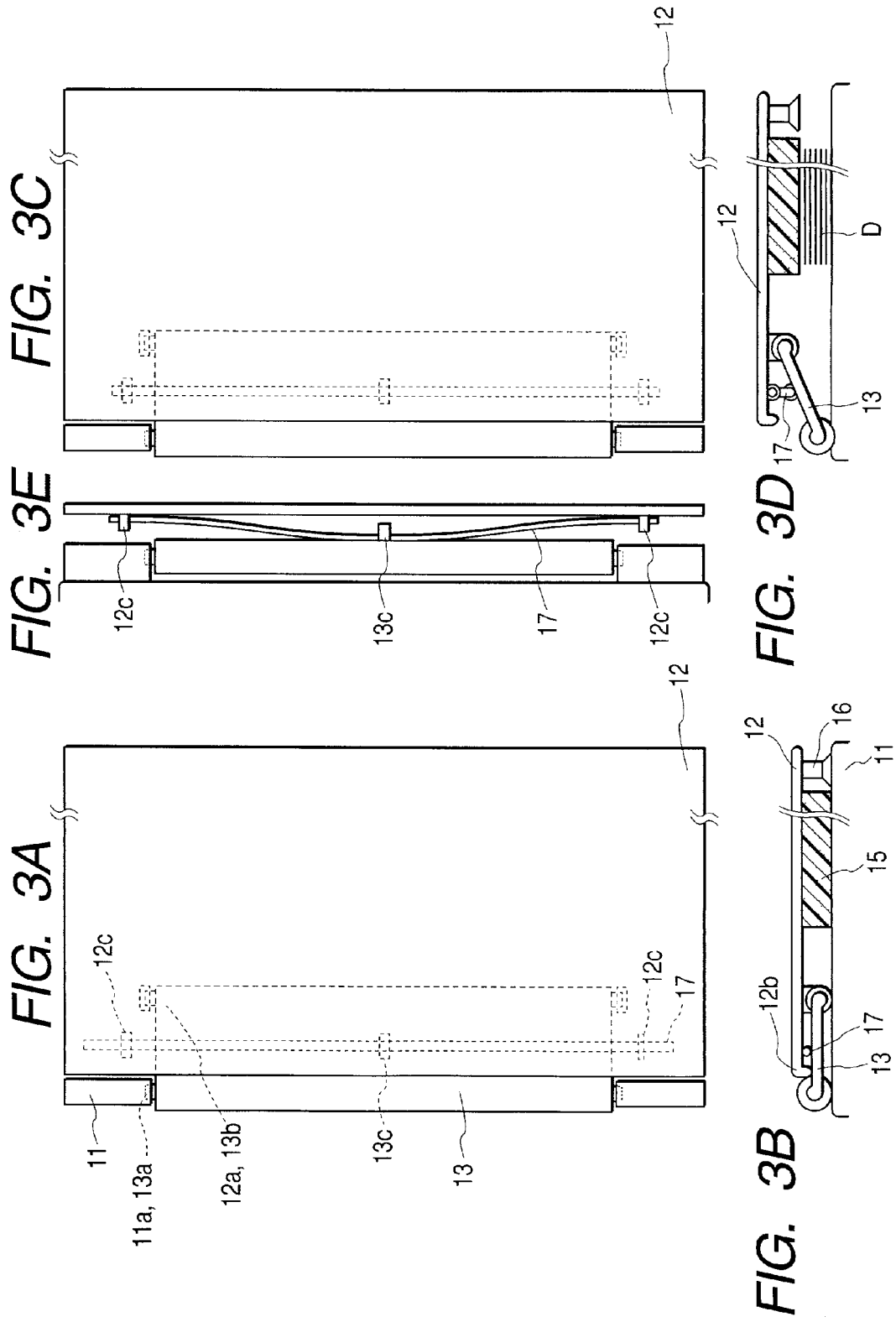

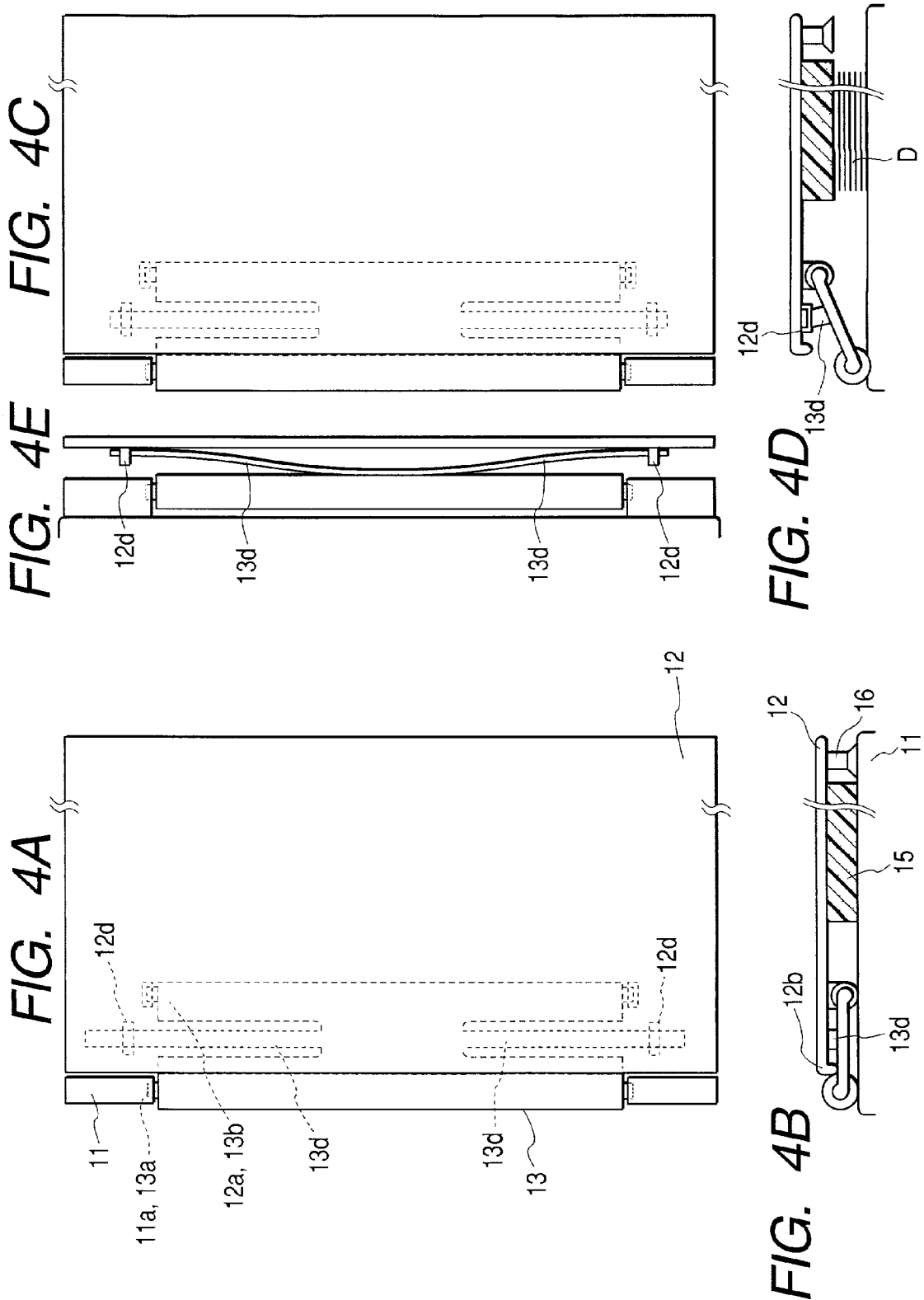

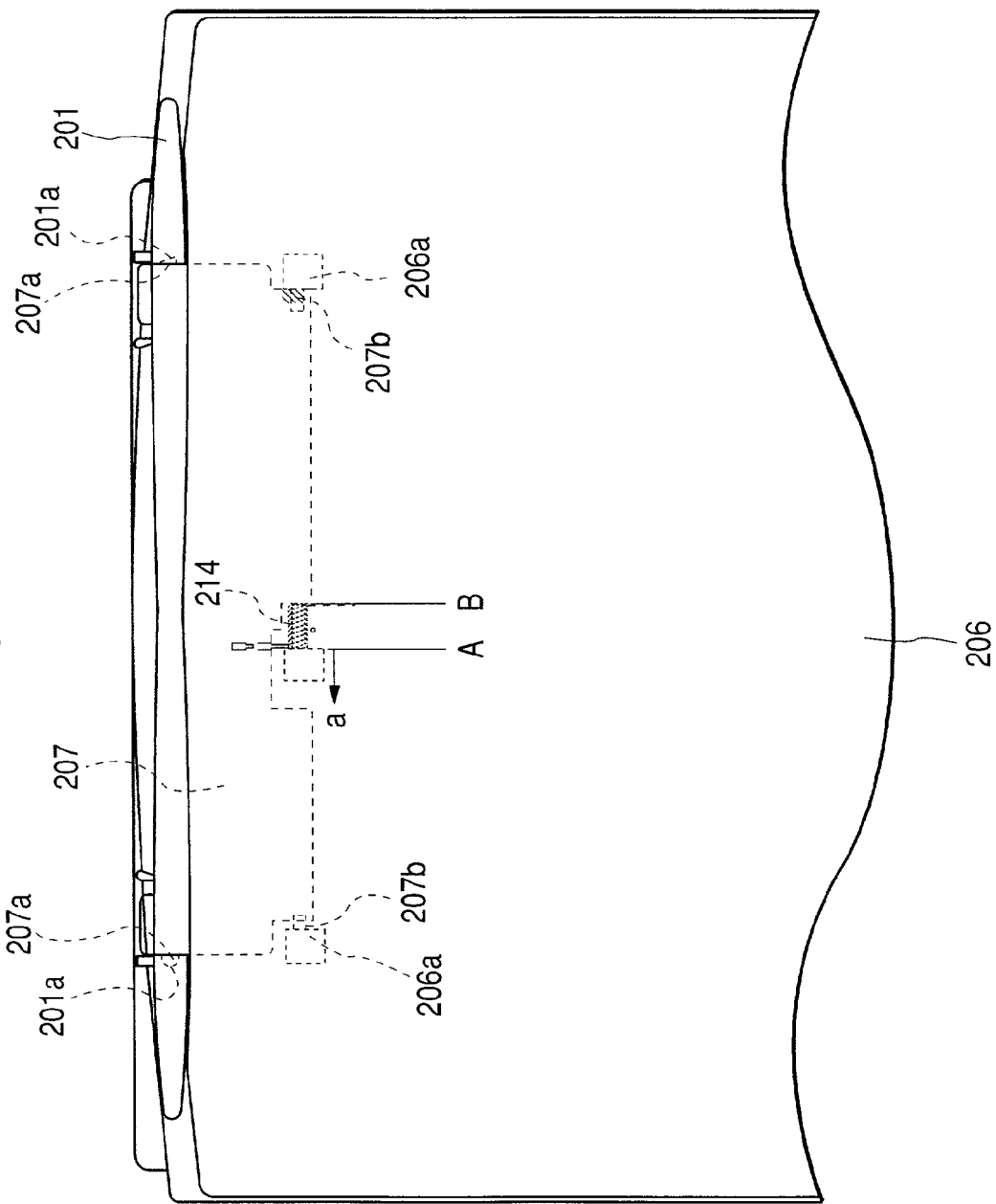

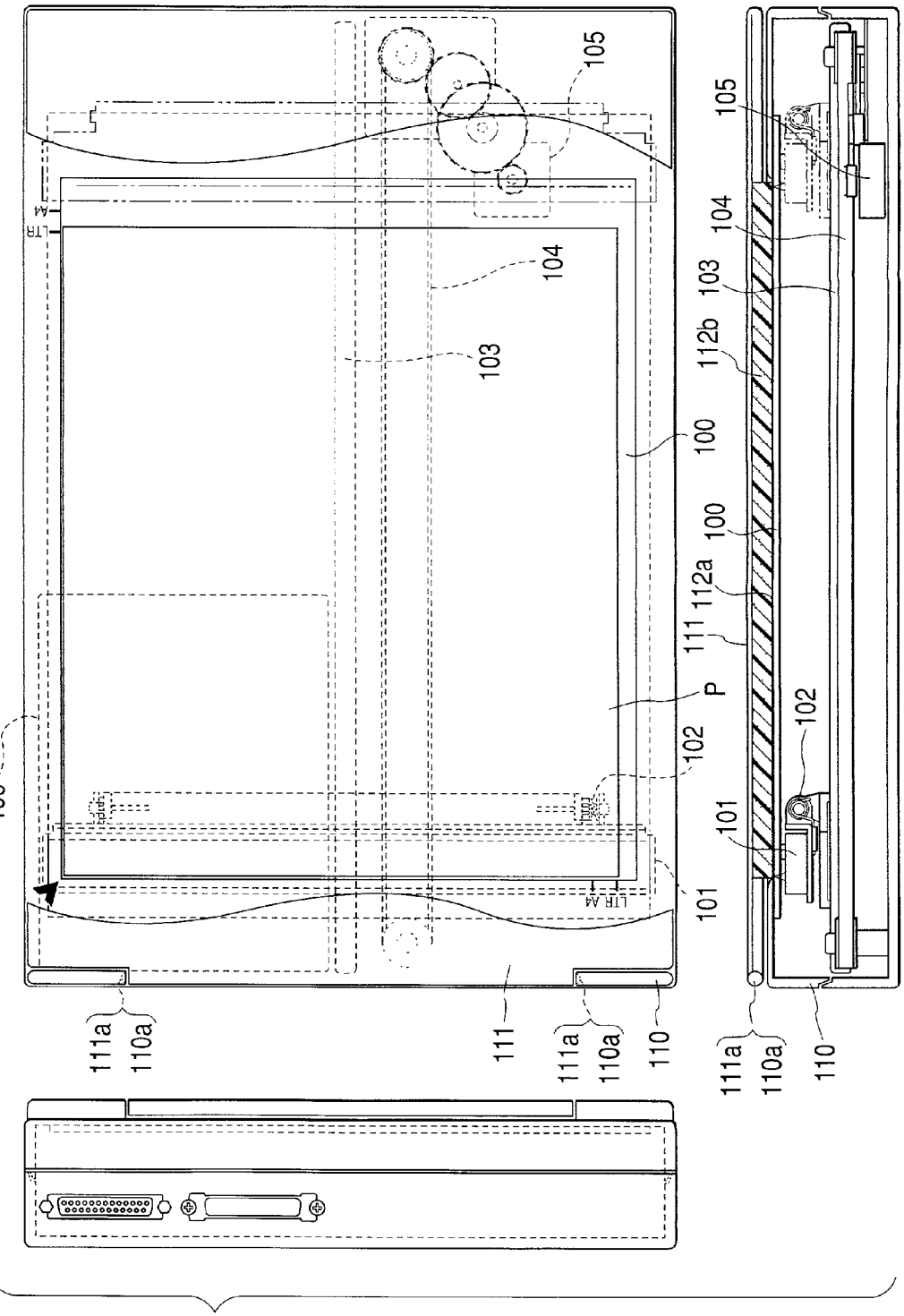

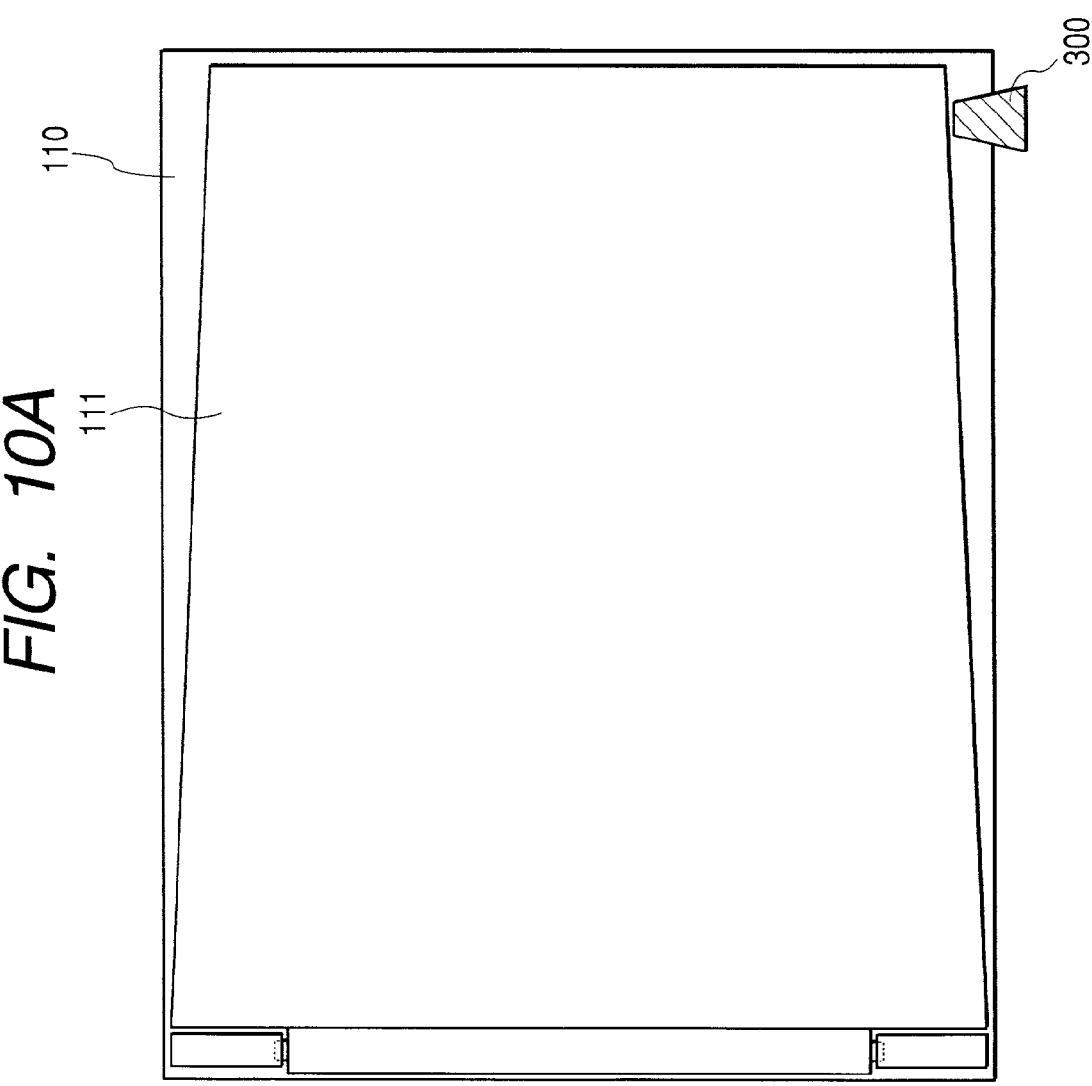
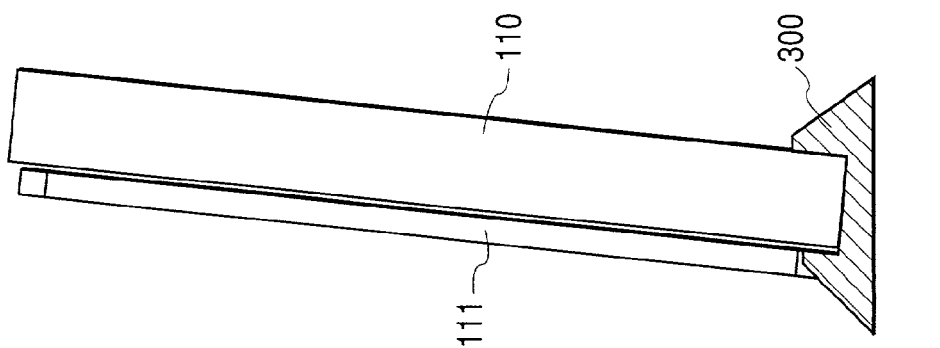

IMAGE READING APPARATUS AND ORIGINAL COVER THEREOF

BACKGROUND OF THE INVENTION

1. Field of the Invention

This invention relates to an image reading apparatus for reading the image of an original, such as a scanner, a copier or a facsimile apparatus, and particularly to an original cover provided in these apparatuses.

2. Description of the Related Art

FIG. 7 of the accompanying drawings is a schematic view showing the construction of a color image reading apparatus.

The letter P designates an original to be read placed on an original glass stand 100, and a contact image sensor 101 is scanned in parallelism to the original glass stand 100 to thereby read an image on the original.

The contact image sensor 101, as schematically shown in FIG. 8 of the accompanying drawings, has incorporated therein LED's 101R, 101G and 101B of three colors which are light sources for irradiating the original, a rod lens array 101L for imaging the reflected light from the original on the light receiving element of an image sensor 101S, and the image sensor 101S. The light sources of three colors are successively changed over and turned on, and the image sensor 101S reads the reflected light of each color from the original to thereby effect color resolving and reading.

The contact image sensor 101, as shown in FIG. 7, is fixedly supported on a slider 102 sliding on a guide shaft 103 fixed to the main body of the apparatus. Also, a belt 104 for transmitting motive power from a motor 105 which is a scanning drive source is fixed to the slider 102. By the forward and reverse rotation of the motor, the contact image sensor 101 is capable of reciprocally scanning within the range of the original glass stand 100.

The constituent elements of the image reading apparatus include, besides those elements described above, an electrical equipment portion 106 comprising a control board and an electric power source. These constituent elements are disposed in a cover 110 for fixedly supporting the original glass stand 100.

On the original glass stand 100, an original cover 111 for pressing the original against a glass plate is openably and closably mounted with the fitted portion of a recess 110a formed in the rear end portion of the cover 110 and the convex portion 111a of the rear end portion of the original cover as a fulcrum. Also, an original pressure sheet 112 comprising a sheet material 112a and a sponge 112b is stuck on the inner surface of the cover which is opposed to the original glass stand 100.

FIG. 9 of the accompanying drawings is a read image data processing block diagram by the image reading apparatus. An image output signal read by the image sensor 101S in synchronism with the LED's successively turned on and off is sent to an amplifier 121 and is amplified thereby, and thereafter is converted into a digital image signal by an A/D converter 122.

The A/D converter divides the dynamic range of the image sensor (the reading output difference between the pure while portion and the inky-black portion of the original) into the bit number thereof and allots the number of gradations in conformity with the brightness of the image on the original.

For example, when an A/D converter having resolving power of 8 bits is used, white to black can be discriminated into 256 gradation levels, and in the case of an A/D converter having resolving power of 10 bits, white to black can be discriminated into 1024 gradation levels.

Accordingly, in an image reading apparatus using an A/D converter of 8 bits, in the color reading by light sources of three colors R, G and B, 24 bits=about 16,700,000 colors can be discriminated, and in the case of an A/D converter of 10 bits, 30 bits=about 1,074,000,000 colors can be discriminated.

There are several kinds as the output forms of the image signal of the image reading apparatus, and an output form suitable for the use of a read image can be selected.

When a writing is to be read and the substance thereof is to be applied to OCR or when a monochromatic drawing is to be read, a monochromatic binary image is suitable therefor, and use is made of image data obtained by transforming an image signal obtained by turning on e.g. only G of the light sources of R, G and B into a binary value by a certain threshold value in an image processing circuit incorporated in a gate array 123.

When an image is to be read with a view to read such as image as a photograph and output it to a monochrome printer, use is made of image data obtained by transforming the image signal also by the G light source into a binary value by the use of halftone processing such as the dither method or the error diffusion method.

When the processing of a color image is to be effected, multivalue (24 bits, etc.) image data is suitable therefor.

The image signal passed through the above-mentioned image processing circuit is outputted to an apparatus 200 such as a personal computer through an interface circuit 124.

In the case of the related art as described above, however, the following problem has arisen.

An image scanner comprising the above-described construction makes the most of the features of a contact image sensor and is very compact and light in weight and therefore, there is one which, as shown in FIGS. 10A and 10B of the accompanying drawings, is vertically placed with one side thereof underlaid by the use of an accessory stand 300 and is made usable even in this state. Originals which can be scanned with the scanner vertically placed are limited to sheet-like originals, and an original cover and the fore end of the apparatus are made closable by a sucker or the like and an original is scanned while being urged against the glass plate.

On the other hand, the original cover in the construction of the related art is opened and closed by the pivotal movement thereof about a fulcrum at the rear end thereof, but in such system, it cannot press a thick original such as a book. Generally, the original cover is adapted to slide in a vertical direction to thereof cope with a thick original.

In such an image scanner, however, if the hinge construction as described above is used, the hinge is opened when the scanner is vertically placed and the original cover floats from the glass plate and becomes incapable of pressing an original and therefore, use could not be made of a hinge for coping with a thick original.

SUMMARY OF THE INVENTION

The present invention has been made in order to solve the above-noted problem peculiar to the related art and the object thereof is to provide an image reading apparatus and the original cover thereof which can press a thick original by a simple construction, and can firmly press the original even during vertical placement scanning.

To achieve the above object, in the present invention, the original cover of an image reading apparatus for covering an original stand which is provided on the image reading apparatus and on which an original is placed is provided with:

a cover member for covering an original placed on the original stand; and a hinge member having one end thereof pivotally supported by the cover member and having the other end thereof mounted on and pivotally supported by the original stand.

The hinge member may preferably be pivotally supported by other area than the end portion of the cover member.

The cover member may preferably be provided with the pivotally movable range thereof restricted relative to the hinge member.

At least one of the cover member and the hinge member may preferably be provided with a restricting portion for restricting the pivotal movement of the cover member relative to the hinge member, or provided with a restricting member having the restricting portion.

The original cover may preferably be provided with a biasing member for biasing the cover member in a direction in which it is opened relative to the hinge member.

The original cover may preferably be provided with a biasing member for biasing the cover member in a direction in which the rotation of the cover member relative to the hinge member is restricted by the restricting portion.

The biasing member may preferably be a torsion coil spring.

The biasing member may preferably be a flexible metal wire material or band-shaped member.

The biasing member may preferably be a portion of the cover member or the hinge member.

The image reading apparatus is provided with the above-described original cover and image reading means for reading the image information of the original placed on the original stand.

Also, the construction according to the present invention for achieving the above object is an image reading apparatus having a cover member openable and closable relative to the main body of the apparatus and for reading an original by reading means, and which has a hinge member for pivotally connecting the main body of the apparatus and the cover member together and in which one end of the hinge member and the main body of the apparatus are pivotally supported, the other end of the hinge member and the cover member are pivotally supported, and the cover member is biased in a direction in which it is opened relative to the hinge member and also biased toward a pivot shaft, by biasing means.

In the above-described construction, when a thick original such as a book is to be set, the cover member is pivotally moved in the supported portions of the hinge member and the main body of the apparatus and the supported portions of the hinge member and the cover member, and comes to cover the thick original. On the other hand, when a thin original is to be set, the supported portions of the main body of the apparatus and the hinge member are pivotally moved, and the cover member biased in a direction in which it is opened by the biasing means is pivotally moved integrally with the hinge member and comes into close contact with the original.

Also, when the apparatus is vertically placed, the cover member becomes liable to rotate in a direction in which it is closed relative to the hinge member, but the posture thereof is maintained by the biasing means and the cover member comes to press the original precisely. Further, the cover member is biased axially of the supported portion thereof and of the hinge member by the biasing means and therefore, any play or slop is not caused.

As described above, according to the present invention, the original cover is provided with a cover member for covering an original placed on an original stand, and a hinge member having one end thereof pivotally supported by the cover member and having the other end thereof mounted on and pivotally supported by the original stand, whereby the original cover can press any thick original by a simple construction.

Also, the cover member has its pivotally movable range restricted relative to the hinge member and therefore, even when the apparatus is vertically placed, it never happens that the hinge is opened as in the related art, and the original can be firmly pressed.

Further, the original cover is provided with biasing means for biasing the cover member in a direction in which it is opened relative to the hinge member, whereby particularly when the apparatus is vertically placed, the hinge is not opened, but the original can be reliably pressed and therefore, there can be provided an image reading apparatus of high quality.

Also, any play or slop of the cover member and the hinge member can be taken up by the biasing means.

BRIEF DESCRIPTION OF THE DRAWINGS

FIGS. 3A, 3B, 3C, 3D ad 3E schematically show the construction of an image reading apparatus according to Embodiment 2.

FIGS. 4A, 4B, 4C, 4D and 4E schematically show the construction of an image reading apparatus according to Embodiment 3.

FIG. 5 is an illustration of a hinge construction for openably and closably connecting the main body of an apparatus and the original cover according to Embodiment 4 together.

FIG. 7 schematically shows the construction of an image reading apparatus according to the related art.

FIGS. 10A and 10B are schematic views showing an image reading apparatus as it is vertically placed.

DESCRIPTION OF THE PREFERRED EMBODIMENTS

Some preferred embodiments of the present invention will hereinafter be described in detail by way of example with reference to the drawings. However, the dimensions, materials, shapes, relative disposition, etc. of constituent parts described in these embodiments should be suitably changed depending on the construction and various conditions of an apparatus to which the present invention is applied, and the scope of the present invention is not restricted to the following embodiments.

Embodiment 1

Figure 1:
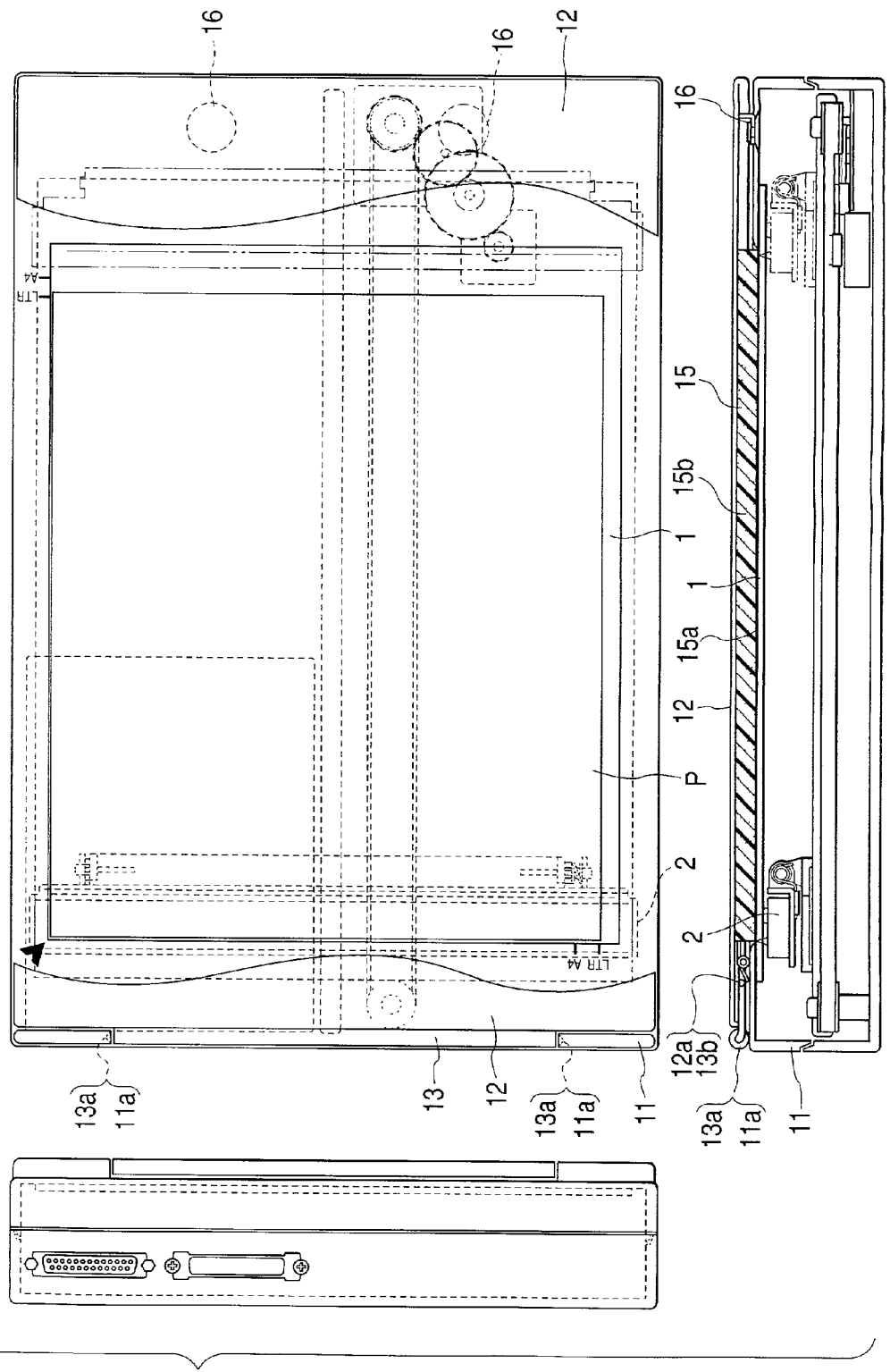
FIG. 1 schematically shows the construction of an image reading apparatus according to Embodiment 1.

FIGS. 1 and 2A, 2B, 2C and 2D show an example of the construction of an image reading apparatus according to Embodiment 1. In FIG. 1, the letter P designates an original to be read placed on an original glass stand 1, and a contact image sensor 2 is scanned in parallelism to the original glass stand 1 to thereby read image information on the original P. The contact image sensor 2 has incorporated therein a light source for irradiating the original, a lens for imaging reflected light from the original on the light receiving element of an image sensor, and the image sensor.

The reference numeral 11 denotes a frame serving also as an outer cover and containing therein the original glass stand 1, the contact image sensor 2, a rail for guiding the movement of the contact image sensor 2, a transmitting mechanism for transmitting a driving force to the contact image sensor 2, a motor which is a drive source, a control board, an electric power source, etc.

As shown in FIGS. 2A to 2D, on the original glass stand 1, an original cover 12 as a cover member for pressing the original against the glass plate and a hinge member 13 are openably and closably mounted with the fitted portion of a recess 11a formed in the rear end portion of the outer cover 11 and a convex portion 13a on the rear end of the hinge member 13 and the fitted portion of a convex portion 13b on the front end of the hinge member 13 and a recess 12a in the rear end portion of the original cover 12 as fulcrums.

The rear end 12b of the original cover 12 juts out rearwardly of the fulcrum (12a/13b) engaged with the hinge member 13 (the hinge member 13 is pivotally supported by other area (recess 12a) than the end portion of the original cover 12, and this jutting-out portion is restricted as a restricting portion and the original cover 12 has its pivotally movable range restricted relative to the hinge member 13.

Further, a torsion coil spring 14 as a biasing member is mounted about the fulcrum (12a/13b), and biases the original cover 12 in a direction in which it is opened relative to the hinge member 13 (is restricted by the rear end 12b which is the jutting-out portion). Also, an original pressure sheet 15 comprising a sheet material 15a and a sponge 15b is stuck on the inner surface of the cover which is opposed to the original glass stand 1.

Further, a sucker 16 is attached to the fore end portion of the original cover 12. Also, that portion of the outer cover 11 which is opposed to the sucker 16 is finished as a smooth surface so that it may become easy for the sucker 16 to closely contact therewith.

The sponge 15b of the original pressure sheet 15 has such a thickness that it collapses more or less with the original cover 12 closed and the sucker 16 brought into close contact with the outer cover 11.

Figure 2A:
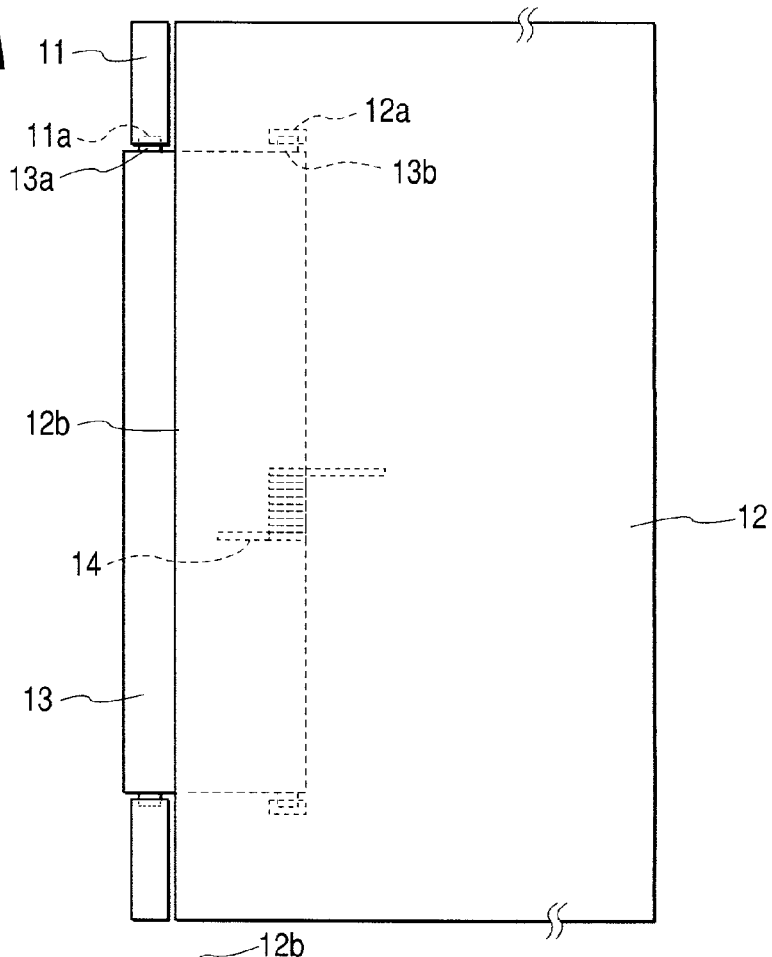
FIG. 2A is a schematic plan view of an original cover.
Figure 2B:
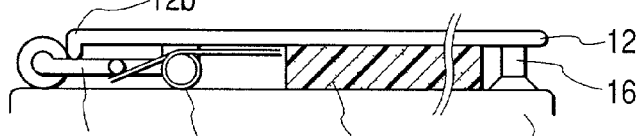
FIGS. 2B, 2C and 2D illustrate the operation of the original cover.
Figure 2C:
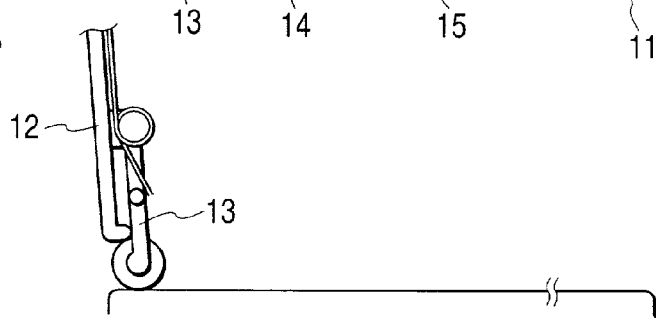

The operation of the present invention is as follows. When the original cover 12 is opened in the ordinary horizontal placement of the apparatus, the original cover 12 is fixed relative to the hinge member 13 due to the effect of the jutting-out portion of the rear end 12b and therefore these are pivotally moved as a unit. As shown in FIG. 2C, the opened posture of the original cover is maintained when it exceeds 90°.

Figure 2D:
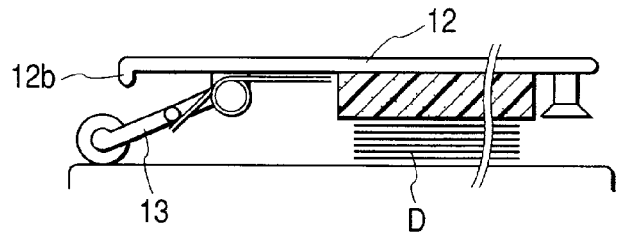

Next, when a thick original D such as a book is set and the original cover is closed, as shown in FIG. 2D, the original cover 12 downwardly pivots about the fulcrum between it and the hinge member 13 with the aid of the self-weight of the original cover 12, and assumes a posture in which it covers an original D1.

In the case of vertical placement scanning, an original is placed on the original glass stand 1, and the original cover 12 is closed and the sucker 16 is pushed from above it, whereupon it comes into close contact with the outer cover 11. At this time, the sponge 15b of the original pressure sheet 15 flexes and therefore, the reaction force thereof is applied to the original through the sheet material 15a, and even if the original is wrinkled or curled, the original is smoothed out and comes into close contact with the glass plate.

When a sheet-like original is set with the apparatus vertically placed, the original cover 12 is closed on the original glass stand 1 with the aid of the self-weight of the original cover 12. However, when the apparatus is vertically placed, gravity toward the original glass stand 1 is not applied and therefore, the original cover 12 becomes liable to rotate in a direction in which the fulcrum (12a/13b) floats from the original glass stand 1, i.e., a direction in which the original cover 12 is closed relative to the hinge member 13 (a direction in which 12b separates from the hinge 13), but is maintained in its opened posture (a posture in which 12b abuts against the hinge 13) by the action of the torsion coil spring 14. Accordingly, the fulcrum (12a/13b) is prevented from floating from the original glass stand 1, and the original can be pressed firmly. Therefore, a clear-cut image can be read.

While in the present embodiment, the rear end 12b of the original cover 12 juts out rearwardly of the fulcrum (12a/13b) at which it is engaged with the hinge member 13, the original cover 12 may be engaged with (supported by) by hinge member 13 at the rear end 12b. Also, while the rear end 12b of the original cover 12 as a restricting portion restricts the pivotal movement of the original cover 12 relative to the hinge member 13, the restricting portion may be provided on at least one of the original cover 12 and the hinge member 13 or a discrete restricting member may be provided.

Embodiment 2

FIGS. 3A, 3B, 3C, 3D and 3E show Embodiment 2. In this embodiment, a spring wire 17 as a flexible metal wire material is used instead of the torsion coil spring in the above-described Embodiment 1. Constituent portions similar to those of Embodiment 1 are given the same reference characters and need not be described.

The central portion of the wire 17 is fixed to the portion 13c of the hinge member 13, and the opposite ends of the wire 17 are engaged with the hook portions 12c of the original cover 12 so that the lengthwise portion of the wire 17 may be movable. When a thick original D is placed and the original cover 12 is closed, as shown in FIGS. 3C, 3D and 3E, the original cover 12 rotates in a direction in which it is closed relative to the hinge member 13, but at this time, the wire 17 flexes and a force of restitution works in a direction in which the original cover 12 is opened relative to the hinge member 13 and accordingly, this embodiment performs the same operation as that of the above-described embodiment.

In the present embodiment, the shape of the spring is simple and therefore a reduction in cost can be expected. It is also possible to use a leaf spring as a flexible band-like member instead of the wire 17.

Embodiment 3

FIGS. 4A, 4B, 4C, 4D and 4E show Embodiment 3.

Usually, the original cover and the hinge member are made of a plastic material. So, in the present embodiment, as shown in FIGS. 4A to 4E, a portion 13d of the hinge member is formed into a thin band-like shape and this portion is given springiness, and one end thereof is engaged with the hook portion 12d of the original cover, whereby the present embodiment can be given a function equal to that of the embodiments described hitherto.

By the present system being carried out, the spring member becomes unnecessary and a further reduction in cost can be achieved.

The spring portion in the present embodiment may be given to the original cover side.

Embodiment 4

(Hinge Construction)

Description will now be made of a construction for opening and closing an original cover 206 relative to the main body 201 of the apparatus. FIG. 5 is an illustration of a hinge construction for openably and closably connecting the main body 201 of the apparatus and the original cover 206 together, and FIGS. 6A, 6B and 6C are illustrations of the original cover as it is opened and closed.

As shown in FIG. 5, on the original glass stand, the original cover 206 for pressing an original against the glass plate and a hinge member 207 are pivotally supported with the fitted portion of a recess 201a formed in the rear end portion of the main body 201 of the apparatus and a convex portion 207a on the rear end of the hinge member and the fitted portion of a convex portion 207b on the front end of the hinge member and a recess 206a in the rear end portion of the original cover as fulcrums, whereby the original cover 206 is openably and closably mounted with respect to the main body 201 of the apparatus.

Figure 6A:
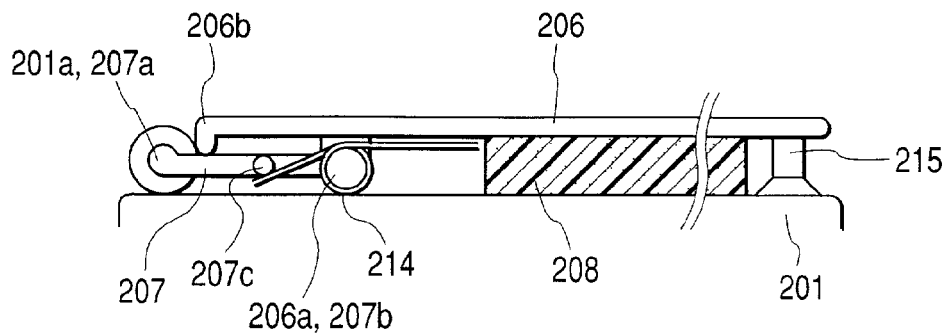
FIGS. 6A, 6B and 6C are illustrations showing the original cover as it is opened and closed.
Figure 6B:
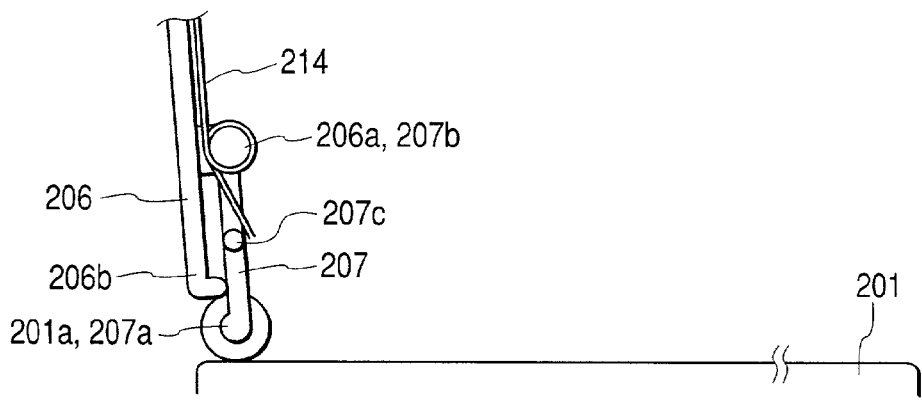
Figure 6C:
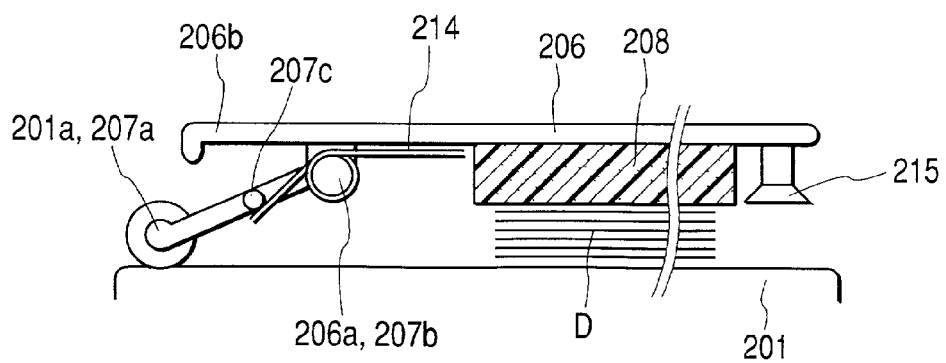
Figure 8:
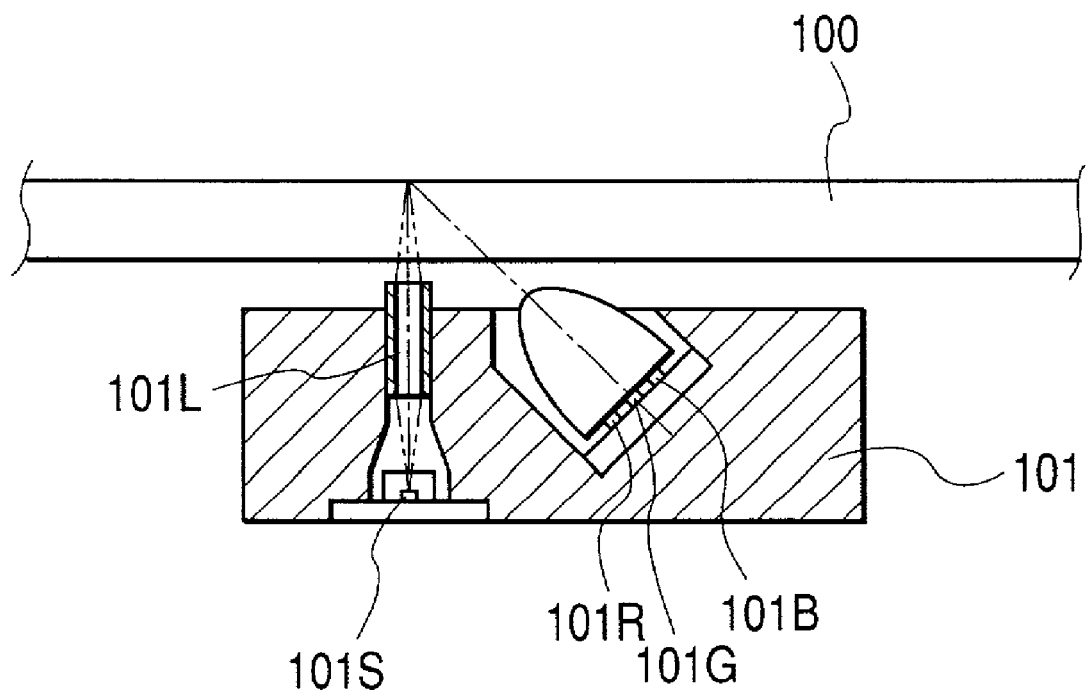
FIG. 8 is a schematic view showing a contact image sensor.
Figure 9:
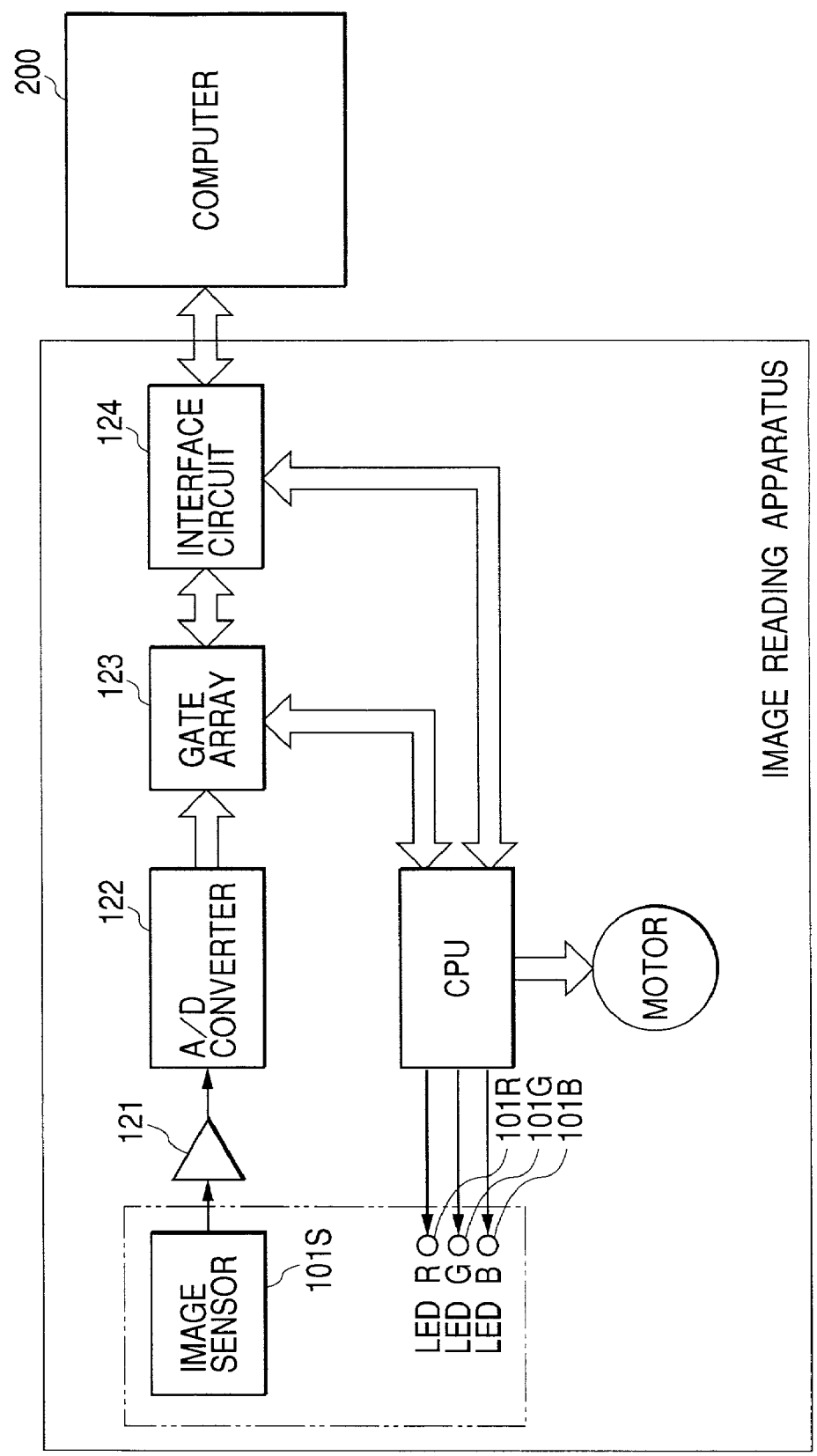
FIG. 9 is a read image data processing block diagram.

Also, as shown in FIGS. 6A to 6C, the rear end 206b of the original cover 206 juts out rearwardly of the supported portions 206a, 207b of the hinge member 207, and the original cover 206 is restricted by this jutting-out portion so that it can rotate only in one direction relative to the hinge member 207.

Further, a torsion compression coil spring 214 which is biasing means is mounted about the aforementioned supported portions 206a, 207b, and the end portions thereof are restrained on the original cover 206 and a projection 207c formed on the hinge member 207. Thereby, the original cover 206 is always biased in a direction in which it is opened relative to the hinge member 207. Further, the torsion compression coil spring 214 biases the original cover 206 so that the axial positional relation between the rotary shafts of the original cover 206 and the hinge member 207 may become constant, that is, any play or slop may be gathered in the direction indicated by the arrow "a" in FIG. 5. Thereby, the torsion compression coil spring biases so as to widen the space between a plane A perpendicular to the rotary shaft of the original cover 206 and a plane B perpendicular to the rotary shaft of the hinge member 207, and any play or slop along the rotary shaft between the original cover 206 and the hinge member 207 is gathered.

Further, a sucker 215 is attached to the pivotally movable fore end portion of the original cover 206. The upper surface of the main body 201 of the apparatus which is opposed to the sucker 215 is finished as a smooth surface so that it may be easy for the sucker 215 to closely contact therewith. The sponge of an original pressure sheet 208 has such a thickness that it collapses more or less with the original cover 206 closed and the sucker 215 brought into close contact with the main body 201 of the apparatus.

In the above-described construction, when the original cover 206 is opened with the image reading apparatus horizontally placed as is usual, the original cover 206 is fixed relative to the hinge member 207 by the effect of the jutting-out portion at the rear end thereof and therefore these are pivotally moved as a unit. When as shown in FIG. 6B, the opening angle exceeds 90°, the opened posture is maintained.

Next, when a thick original D such as a book is set and the original cover 206 is closed, as shown in FIG. 6C, the original cover 206 downwardly pivots with the aid of the self-weight of the original cover 206 about the supported portions 206a, 207b between it and the hinge member 207, and the original pressure sheet 208 assumes a posture in which it presses the original D. On the other hand, when a thin original is set and the original cover 206 is closed, the original cover 206 and the hinge member 207 are biased axially of the rotary shafts thereof by the torsion compression coil spring 214 and therefore, the two are pivotally moved as a unit. Again in the case of a thin original, the original pressure sheet 208 closely contact with the original, and the original is precisely fixed on the original glass stand.

In the case of vertical placement scanning, an original is placed on the original glass stand and the original cover 206 is closed and the sucker 215 is pushed from about it, whereupon this is brought into close contact with the main body of the apparatus. At this time, the sponge of the original pressure sheet 208 is compressed and therefore, the reaction force of the sponge is applied to the original through the original pressure sheet, and even if the original is wrinkled or curled, the original is smoothed out and closely contacts with the original glass stand. At this time, the apparatus is vertically placed and therefore the original cover 206 becomes liable to rotate in a direction in which it is closed relative to the hinge member 207, but it is maintained in its opened posture by the action of the torsion compression coil spring 214. Therefore, a clear-cut image can be read.

Also, there is no play or slop of the original cover 206 and the hinge member 207 and therefore, it is possible to prevent the occurrence of a situation in which as in the related art, when the original cover is closed, the relation between the original glass stand and the original cover becomes inconstant and the original moves easily.

What is claimed is:

1. An original cover of an image reading apparatus, comprising:
    a cover member for covering an original placed on an original stand;
    a hinge member having one end thereof pivotally supporting a rotary shaft on said cover member and having the other end thereof mounted on and pivotally supported by said original stand; and
    one torsion spring having a coil body and arms, said coil body configured and positioned to bias said cover member in a direction parallel to said rotary shaft to eliminate the play between said hinge member and said cover member in the direction parallel to said rotary shaft, thereby making constant the axial positional relation between said hinge member and said cover member and said arms configured and positioned to bias said cover member in a direction in which said cover member is opened with respect to said hinge member.

2. The original cover according to claim 1, wherein said hinge member is pivotally supports an area other than an end portion of said cover member.

3. The original cover according to claim 1, wherein said cover member has its pivotally movable range restricted with respect to said hinge member.

4. The original cover according to claim 3, wherein at least one of said cover member and said hinge member is provided with a restricting portion for restricting the pivotally movable range of said cover member in the direction in which said cover member is opened with respect to said hinge member.

5. The original cover according to claim 1, wherein said one torsion spring is disposed at a center of said hinge member in the direction parallel to said rotary shaft.

6. An image reading apparatus comprising:
    an original cover as recited in claims 1, 2, 3, 4, or 5; and
    image reading means for reading image information of an original placed on an original stand.

* * * * *

UNITED STATES PATENT AND TRADEMARK OFFICE
CERTIFICATE OF CORRECTION

PATENT NO. : 7,411,695 B2  Page 1 of 1
APPLICATION NO. : 09/899022
DATED : August 12, 2008
INVENTOR(S) : Yukitoshi Takeuchi et al.

It is certified that error appears in the above-identified patent and that said Letters Patent is hereby corrected as shown below:

COLUMN 1:
Line 59, "while" should read -- white --.

COLUMN 3:
Line 63, "slop" should read -- slip --.

COLUMN 4:
Line 15, "any" should read -- no --.
Line 16, "slop" should read -- slip -- and "not" should be deleted.

COLUMN 7:
Line 35, "slop" should read -- slip --.
Line 40, "slop" should read -- slip --.

COLUMN 8:
Line 4, "contact" should read -- contacts --.
Line 21, "slop" should read -- slip --.
Line 47, "is" should be deleted.

Signed and Sealed this

Sixth Day of January, 2009

JON W. DUDAS
*Director of the United States Patent and Trademark Office*